(12) United States Patent
Gimpel

(10) Patent No.: US 10,518,840 B1
(45) Date of Patent: Dec. 31, 2019

(54) GIMPEL'S SET PARTS AND ASSEMBLIES FOR TRANSFORMATION OF TREADLE LEVER ROCKING MOVEMENT INTO ROTARY MOVEMENT OF BICYCLE DRIVE SHAFT

(71) Applicant: Efim Gimpel, Lynn, MA (US)

(72) Inventor: Efim Gimpel, Lynn, MA (US)

( * ) Notice: Subject to any disclaimer, the term of this patent is extended or adjusted under 35 U.S.C. 154(b) by 0 days.

(21) Appl. No.: 16/551,592

(22) Filed: Aug. 26, 2019

(51) Int. Cl.
*B62M 1/36* (2013.01)
*B62M 1/28* (2013.01)
*B62M 9/02* (2006.01)

(52) U.S. Cl.
CPC ............... *B62M 1/28* (2013.01); *B62M 9/02* (2013.01)

(58) Field of Classification Search
CPC .................................. B62M 1/28; B62M 9/02
USPC ........................................................ 280/252
See application file for complete search history.

(56) References Cited

U.S. PATENT DOCUMENTS

| | | | | |
|---|---|---|---|---|
| 5,242,182 A * | 9/1993 | Bezerra | ................ | B62M 1/30 280/253 |
| 5,390,773 A * | 2/1995 | Proia | ................ | B62M 1/24 192/41 R |
| 2008/0174086 A1 * | 7/2008 | Clemons | ................ | B62M 1/24 280/258 |
| 2011/0115190 A1 * | 5/2011 | McIsaac | ................ | B62M 1/24 280/255 |
| 2013/0025383 A1 * | 1/2013 | Chen | ................ | B62M 1/36 74/43 |
| 2015/0137475 A1 * | 5/2015 | Brewer | ................ | B62K 3/002 280/259 |
| 2016/0152300 A1 * | 6/2016 | Gimpel | ................ | B62M 1/24 74/88 |

* cited by examiner

*Primary Examiner* — Jacob D Knutson
(74) *Attorney, Agent, or Firm* — Nadya Reingand; Yan Hankin

(57) ABSTRACT

The present invention is a removable device/mechanism which is installed onto a bicycle. The installed device assists a user in pedaling in a unique fashion which removes the stresses and forces of ordinary cycling. The movement of the pedals becomes such that force is caused only during half of the circumferential movement of each pedal, similar to a step/climbing machine. The movement is achieved by placing two shafts which move alongside planes parallel to the user during motion, the two shafts being interconnected at their top and bottom ends. The bottom ends are connected to the gears and chain of the bicycle as described herein. The top ends are connected to a reverse mechanism as described herein. The combination of elements assists the user by turning an ordinary bicycle into a more relaxed use machine, allowing more people to use bicycles.

9 Claims, 5 Drawing Sheets

GIMPEL'S SET PARTS AND ASSEMBLIES FOR TRANSFORMATION OF TREADLE LEVER ROCKING MOVEMENT INTO ROTARY MOVEMENT OF BICYCLE DRIVE SHAFT

FIELD OF THE INVENTION

This invention relates to bicycles and more particularly to devices to be installed onto bicycles for changing the motion of the pedals of the bicycle.

BACKGROUND OF THE INVENTION

The closest analogue of the claimed technical solution is the device by the patent serial number U.S. Pat. No. 9,783, 261 B2, Oct. 10, 2017, "Dismountable device for transformation of treadle lever rocking movement into rotary movement of bicycle drive shaft», publication date: Jun. 2, 2016, by the inventor, Efim Gimpel. This device is implemented in the form of two identical sprockets on the axis of simultaneous swing of each pedal lever around the axis of rotation of the bicycle drive shaft, connected in pairs by two bicycle chains with tension springs connecting both ends of the chain, with sprockets mounted singly at each outer end of the shafts reversed by the reducer, whose rotation axes are parallel to the axis of swing of the pedals, with the upper and lower sprockets rotating in pairs in one of the planes perpendicular to the axis of rotation of the bicycle drive shaft.

The main disadvantage of the above analogue is the usage of flexible links in the form of bicycle chains for the transmission of the working force to bring into oscillatory motion the pedal levers, said levers sitting on the working axis of rotation of the bicycle drive shaft through a single-stage reducer. However, during the working operation of the bicycle under the influence of tensile forces of the chain due to the natural gaps and wear of individual elements of the chain, the chain can jump off the driven sprockets, which requires the use of tightening devices while using the bike, and which complicates the conditions of its operation and reduces the reliability of the design.

SUMMARY OF THE INVENTION

The technical result of the claimed invention is the elimination of the shortcomings of the prototype, i.e., the simplification of the design of the device by the implementation of the rocking motion of the pedals, improved conditions of its operation, and increasing the reliability of the construction as a whole.

The achieved technical result is provided by a removable device for the rocking motion of the pedal units of any bicycle. The removeable device comprises a single-stage reducer associated with pedal levers, each pedal lever being connected to a built-in one-way clutch.

The connections to the built-in one-way clutches (shafts) comprise a pivotal connection at the pedal end of a shaft, such that the shaft may rotate with the pedal as it is rotated, and a toothed part connection at the opposite end of the shaft. The toothed part connection is in engagement with the gear of the bicycle such that the pedal may only create a force during 180 degrees of motion. Essentially, the toothed parted rotates to a portion where it can no longer create a force on the gear or the slide. The other pedal is similarly connected to a built-in one way clutch (shaft) which comprises the same elements but moves reciprocally to the first pedal via a reverse motion means. Such means for reverse motion may comprise any known methods for reverse motion of two gears. Such reverse motion means allows for the pedals to form a rocking motion movement.

In one case, a gear may be installed in the reversing unit (i.e. means for reverse motion), the gear being engaged with a gear part of the rod. The opposite end of the rod is engaged with the gear from the bottom. On the other side of the shaft, the second rod contacts the top with the gear fixed to the same shaft, which leads to the opposite movement of the second rod and the second pedal lever of the bicycle.

The rod drive is carried out from the gears installed both in the body of the pedal unit and on the shaft of the reversing unit, connected by rods to each of its two gear parts.

BRIEF DESCRIPTION OF THE DRAWINGS

Below are brief descriptions of the drawings of the proposed technical solutions.

FIGS. 1-7 show the following elements:
1—the bicycle chassis;
2—lower connection between extender and corresponding shaft of the device; 2A—left lower connection; 2B—right lower connection;
3A and 3B—the drive shafts of the device; 3A—left shaft; 3B—right shaft;
4—the means for reversing motion/reversing mechanism and housing for said means;
5—extender; 5A—left extender; 5B—right extender (connecting the pedals to their respective shafts);
6—gear(s);
7—pedal;
8—pedal lever;
9—the ratchet mechanism (i.e. toothed part);
10—pusher (driven by the pedals to move the toothed part circumferentially around the gear; the pusher is hingedly connected to the toothed part).
11-14—gears within an exemplary embodiment of a means for reversing motion.
15-16—bars within an exemplary embodiment of a means for reversing motion.

DETAILED DESCRIPTION OF THE PREFERRED EMBODIMENT

The present invention is a removable device for a rocking motion of foot nodes (e.g., pedals) of a bicycle. "Rocking motion" is defined herein as a motion along only half of the circumference of the circle formed by the movement of the nodes of a bicycle. The term is used also because the movement is reciprocal, and might resemble a rocking chair's motion. The device comprises a single-stage gearbox associated with, e.g., the pedal levers of a bicycle, the levers comprise connections to built-in one-way crutches (shafts). The built-in one-way clutches (shafts) comprise a pivotal connection at the pedal end of a shaft, such that the shaft may rotate with the pedal as it is rotated, and a toothed part connection at the opposite end of the shaft. The toothed part connection is in engagement with the gear of the bicycle such that the pedal may only create a force during 180 degrees of motion. Essentially, the toothed parted rotates to a portion where it can no longer create a force on the gear or the slide. The other pedal is similarly connected to a built-in one way clutch (shaft) which comprises the same elements but moves reciprocally to the first pedal via a reverse motion means. Such means for reverse motion may comprise any known methods for reverse motion of two gears. Such reverse motion means allows for the pedals to form a rocking motion movement.

In the case of using of a converter instead of a one-step reducer, the toothed parts are mounted on the opposite parts of the contact with the gears—i.e., one from the bottom and the other from the top of the shaft.

Figure 1:
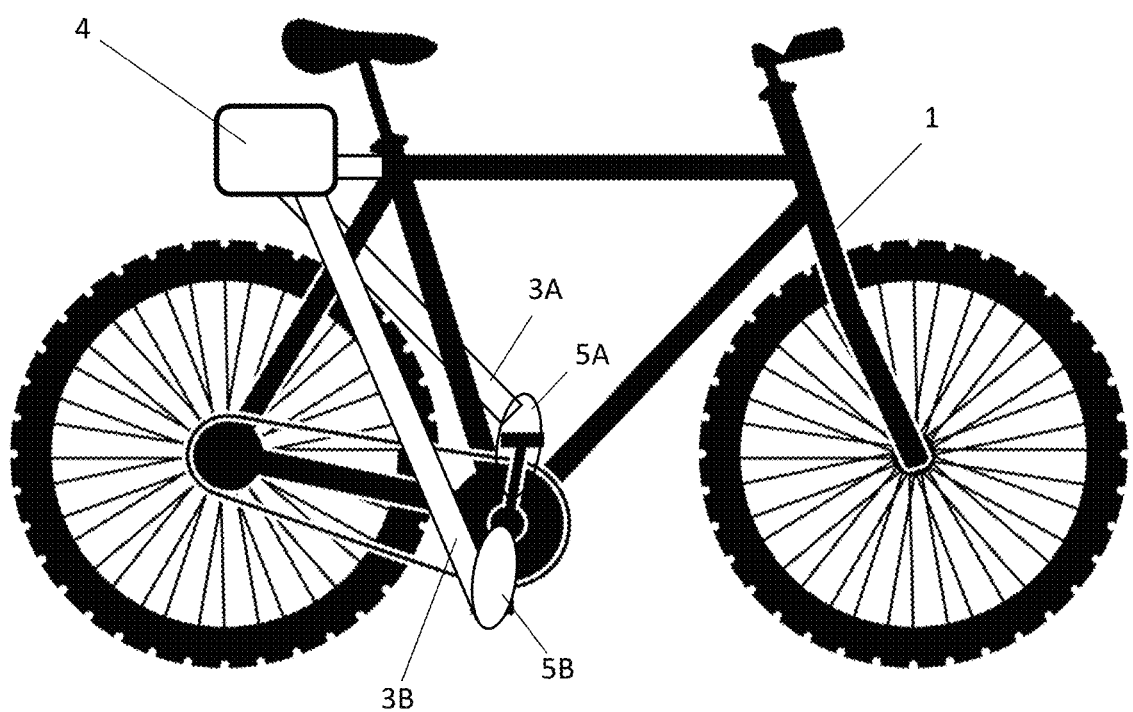
FIG. 1—A general view of a bicycle assembly of the present invention as installed on a general bicycle.
Figure 2:
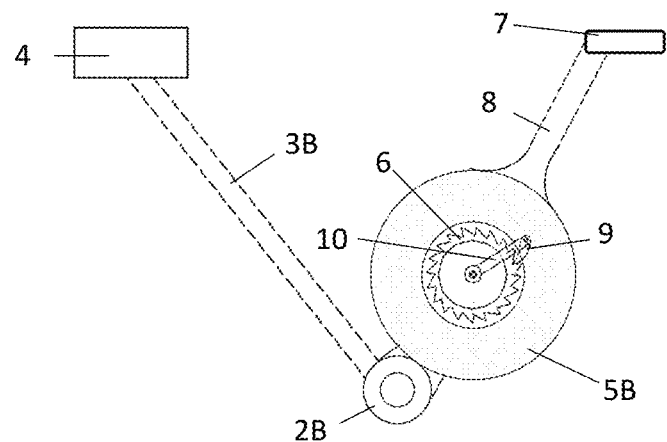
FIG. 2—Device assembly—right side of one embodiment.
Figure 3:
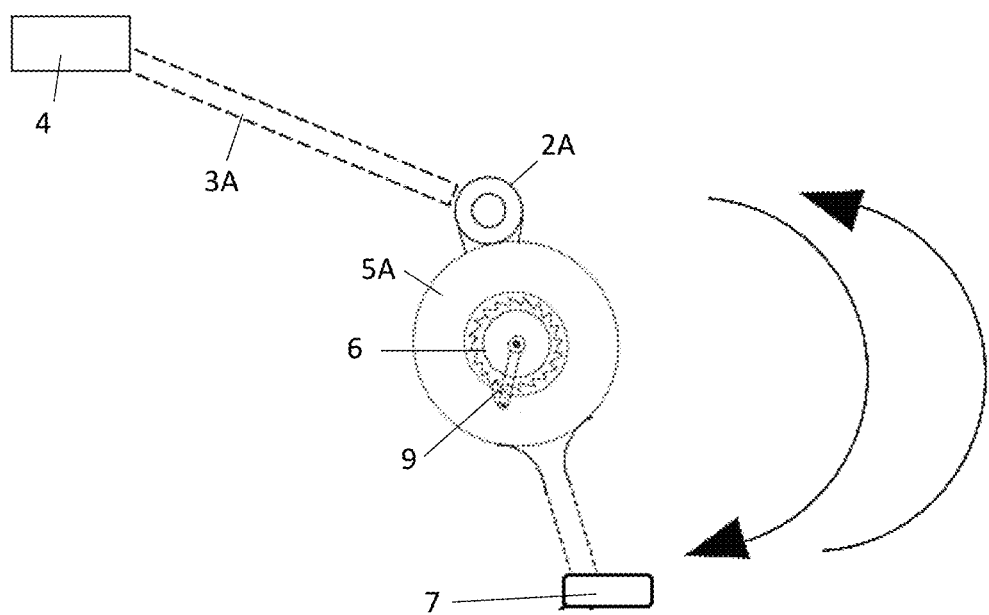
FIG. 3—Device assembly—left side of one embodiment.
Figure 4A:
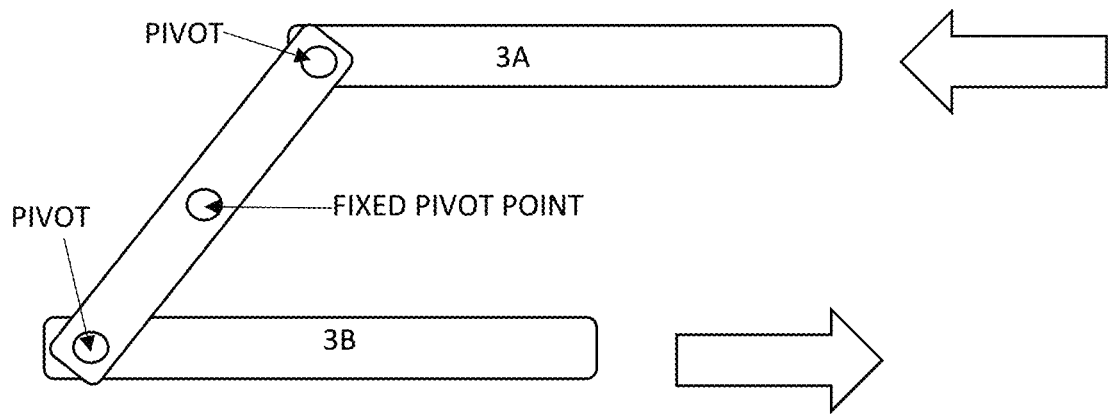
FIGS. 4A-4B—Exemplary embodiments of a means for reverse motion/reverse motion mechanism according to the present invention.
Figure 4B:
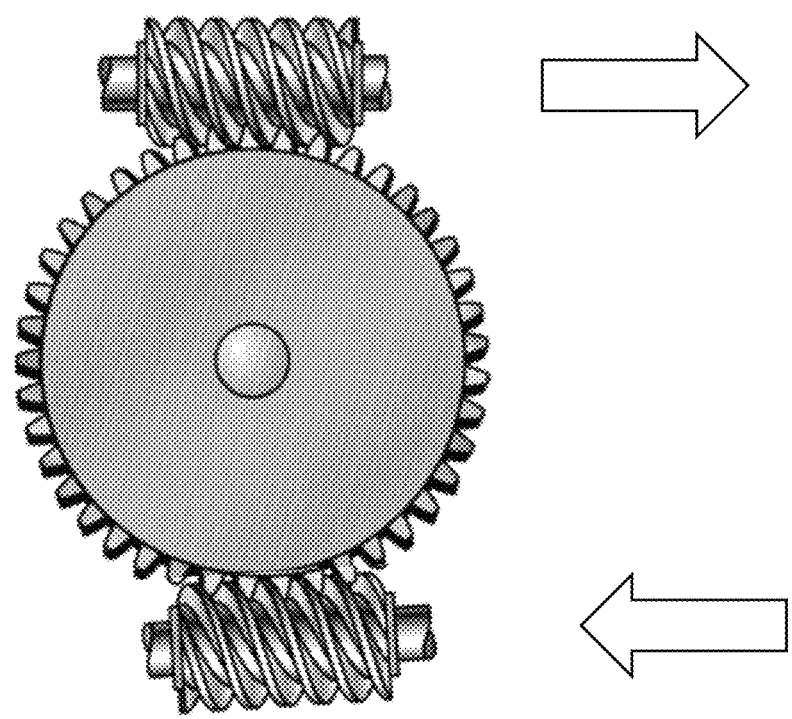
Figure 5:
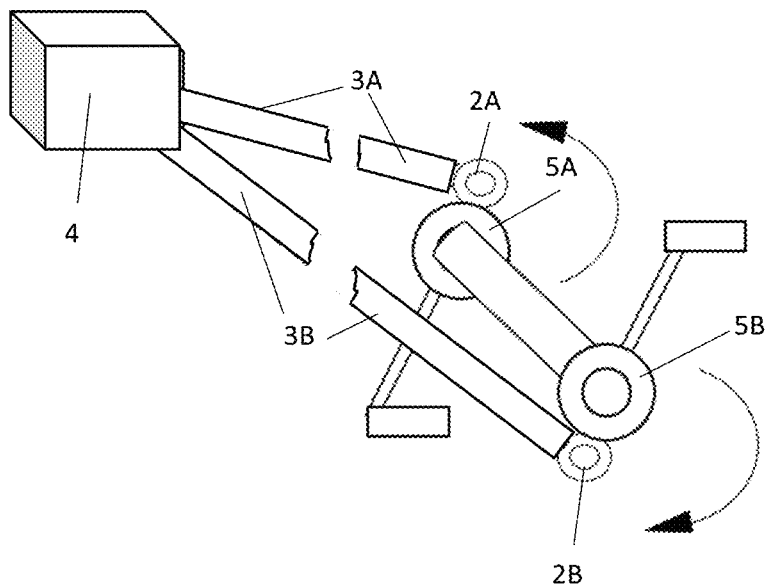
FIG. 5—Detailed device assembly—both sides, including axis of rotation of a bicycle.
Figure 7:
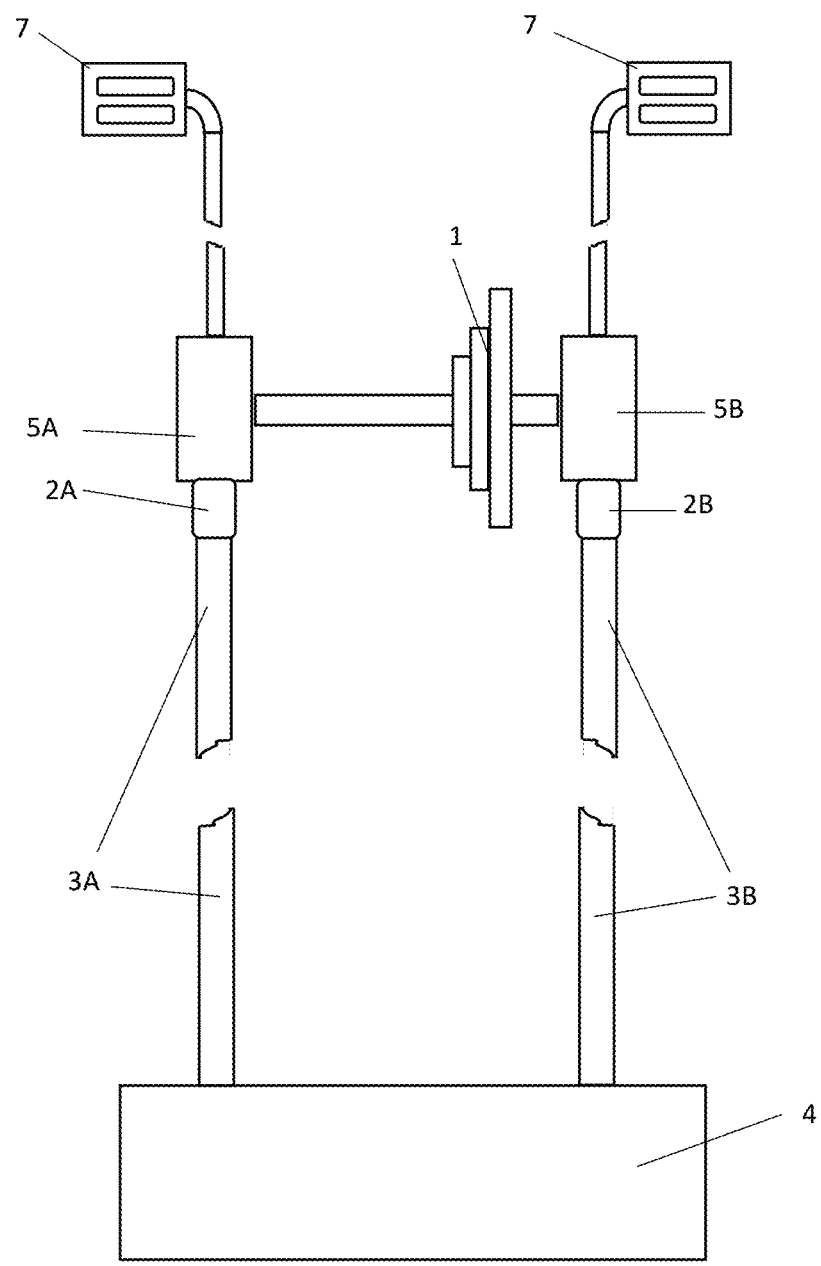
FIG. 7—Top view of the device of the present invention relative to the gears and axis of rotation of a bicycle.

A removable device for the rocking pedal units of the bicycle is installed in addition to the standard units on the bicycle frame. The removable device comprises two units (See FIG. 1):

a) single-stage gearbox (see FIG. 7), connected with b) drive units 3A, 3B, mounted on both sides of a bicycle, coupled to the gearbox 4, said gearbox 4 comprising a means for reversing motion, each drive unit being further connected on an opposite and lower end to rigid rods 2A, 2B in a hinged manner. Said rods 2A, 2B being coupled to corresponding pedals (or other nodes) of a bicycle. Forces P and P* are created when a user engages the pedals of the bicycle; however the pedals only move along 180 degrees of rotating motion. The motion created is a rocking motion.

When forces "P" and "P*" act alternatively on the pedals 7, they rotate the drive shaft 6 of the bicycle, resulting in a translational motion of the rods 2A, 2B. In this case, the ends of each of the drive shafts 3A, 3B is connected pivotally at the point where the rigid rods 2A, 2B and the bottom ends of the drive shafts 3A, 3B meet. The rods 2A, 2B move along the same plane as the lever/pusher 10 in engagement with the gear 6. The pusher 10 is located on the shaft with a toothed part 9, the toothed part 9 turns with the drive shafts and rods based on the swing angle of the foot lever. The opposite shaft, through, e.g., a reducer, spins in the opposite circular direction. At the same time, the rods mounted on opposite sides of the bicycle rotate the hinge joints in opposite directions, and the body of the user moves smoothly through the one-way rotation. By continuing the cyclic influence of the forces on each pedal, the process repeats periodically. It is noted that via movement of the pedals on only 180 degree of rotation, the feet of a user only form a pushing motion along the front half circular portion of the full rotary capacity of the pedals, and less bending of the knees is therefore required.

Figure 6:
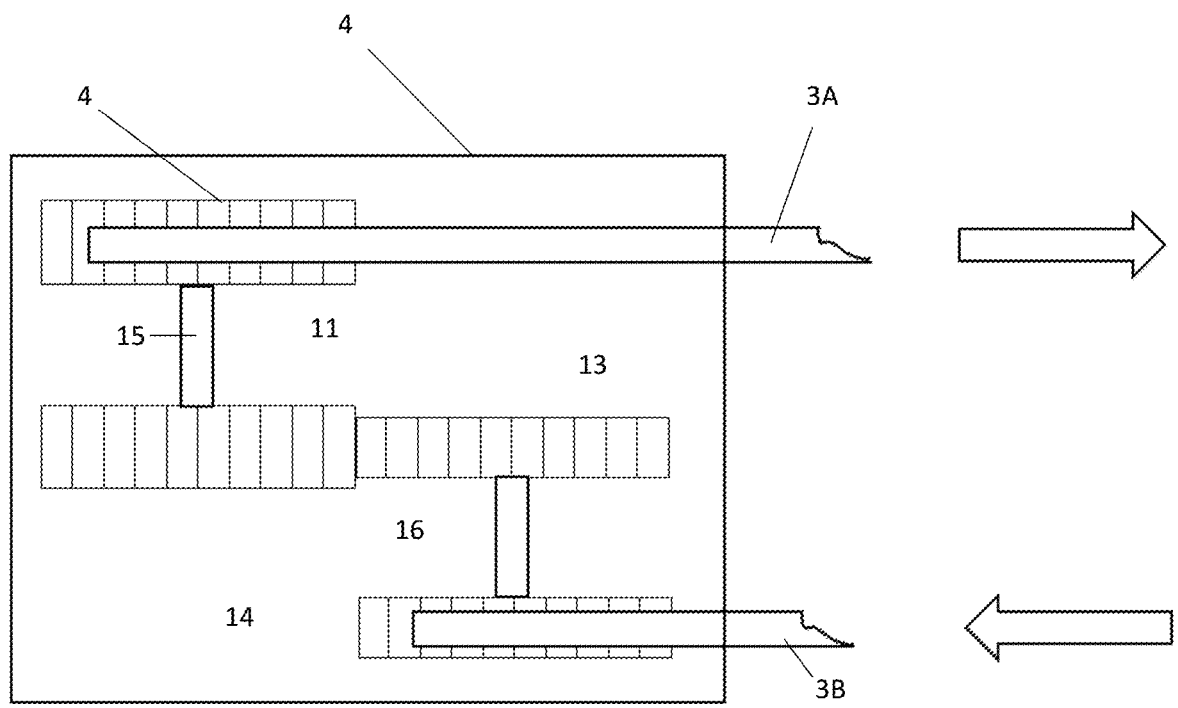
FIG. 6—Top cross-sectional view of an exemplary reverse motion mechanism with gears, positioned relative to the shafts of the device of the present invention.

With reference to FIG. 6, an exemplary embodiment of a reverse mechanism is shown. It should be noted that any known reverse mechanism (i.e. means for reversing motion) may be used for the present invention. However, an exemplary embodiment is shown in FIG. 6. There, four gear structures 11, 12, 13, 14 are shown inside the housing 4. One shaft 3A is engaged with gear 11. Gear 11 is connected to and synchronously moves with gear 12. Gear 12 is engaged with gear 13, which moves synchronously with gear 14. Gear 14 is in turn engaged with the second shaft 3B. The synchronous movement is caused by bars 15, 16 which connect corresponding gears. With such a design, the rotational and forward-backward motion of the first shaft 3A moves the system such that an equal and opposite motion of the second shaft 3B results. Gears 12 and 13 rotate along each other in a clockwise or counter-clockwise fashion, along their teeth. The bars 15 and 16 allow for the correspondingly attached gears 11 and 14 to move in a similar circular fashion to gears 12 and 13 but along a larger circumference. The movement of all gears therefore allows for the opposite motion of each shaft.

For a second variant of the reversing device, additional toothed parts may be installed. The toothed parts of the sliders installed in the housings are mounted on the opposite parts of the contact with the gears—one from the bottom and the other from the top end of each shaft, and the process is repeated in the same way as indicated above.

For a third variant of the means for reversing motion, a simple reverse mechanism may be used. Such a reverse mechanism may be, e.g., a linkage comprising a fixed pivot point and two moving pivots, wherein both shafts are connected in a similar direction telative to the moving pivot points, and at least a third bar interconnecting the moving pivot points, an idler gear, a bevel gear feed reserve mechanism, or any other known reverse mechanism.

Installation of parts and assemblies on the drive shaft is preferably performed in the following order (see FIGS. 1-8):

The pedal levers are removed from the bicycle, and their pedals are installed on levers of the device 7.

The $C_{LEFT}$ unit, which transmits the operating torque when rotating counterclockwise, is rigidly mounted on the shaft 3A, and secured with a limiter.

The $C_{RIGHT}$ node, transmitting a working torque on a shaft by rotating it clockwise, is mounted on the extender 5A in the same manner by another limiter.

The reducer is installed on the frame keeping the parallelism of axes A1-A1, A2-A2, and axis of rotation of the shaft, and fixed rigidly by the clamp.

The limiters are installed on the shafts freely, i.e. in a hinged manner such that motion around an axis is free, providing the axes are along one plane;

The other limiters are installed on the shaft analogously.

The external stopper is installed freely on the shaft (left side of the assembly).

The external stopper is installed freely in the other shaft, analogously (right side of the assembly).

The internal stopper (left side of the assembly) is moved along the shaft until it touches the butt end of the node, and it may be fixed. During this operation, the axes must be kept parallel, while one node is freely moved.

The internal stopper (right side of the assembly) is mounted analogously.

After the final installation and assembly of all of the above-mentioned parts, the proposed device works as follows:

When the user applies the force P by pressing down on the left pedal, the rod connected to the pedal lever begins to move, the gear (fixed on the shaft by the key) turns, and through the reducer, turns the shaft in the opposite direction. As a result, the rod lifts (through the connection) the lever with the pedal to the upper position. This process is repeated periodically.

The only difference of a second embodiment is that instead of a single-stage gearbox, the reversing device/means for reversing motion is used instead, with one shaft which has the same diameter as the shafts of the device. The toothed part is in contact with the gears of the reverse motion device at its opposite ends (one from the top, the other from the bottom). Therefore, a second toothed part mechanism is employed at a top end connection of the shafts, in addition to the bottom end connection of each shaft of the device.

It should be noted that the diameters of the gears, sitting on the same axis must be identical and in pairs.

The analysis and testing of the prototype confirm the technical result of the claimed invention: simplification of the device design of the pedals' rocking motion, improving of its operating conditions, as well as improving the reliability of the design in whole.

The main consumers of the device include but are not limited to the following:

1—the owners of bicycles to travel over long distances through rough terrain with physical savings costs up to 30%.

2—patients after knee surgery, including the use of a modernized bicycles as a mobile simulator.

3—pedicabs in the carriage of tourists.

4—places of hire of the modernized tricycles for journey on shops of the central streets of big cities where parking is forbidden or difficult.

Also, the proposed device will help to create an environmentally friendly mode of transport and can be used in a wheelchair, boat, educational equipment, compact, easy to use.

The invention is new, since the whole set of features is not known from the previous level of technology given in the relevant section of the description, as well as industrially applicable in the field of technology relating to Bicycle structures with muscle drive.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A removable device for a bicycle, comprising:
a chain mechanism connecting an axis for pedal rotation of the bicycle and an axis of a back wheel of the bicycle,
a first and a second shaft, the first and second shafts being positioned on opposite sides of a bicycle frame,
the first and second shafts being hingedly connected to each other on upper ends and lowers ends of each shaft,
an upper end connection between said first and second shafts, said upper end connection comprising a reverse mechanism, said reverse mechanism moving the second shaft in an opposite direction of movement relative to the first shaft, the reverse mechanism being attached to an upper part of the bicycle frame,
a lower end connection between said first and second shafts, said lower end connection comprising individual connections to corresponding first and second pedal levers, said pedal levers being connected to pedals of the bicycle via corresponding parts,
the pedal levers being connected to the axis of pedal rotation of the bicycle,
the pedal levers also being connected to corresponding shafts.

2. The device according to claim 1, wherein said pedals of the bicycle are located on a line passing through the axis of pedal rotation and said first and second pedal levers.

3. The device according to claim 1, wherein the lower end connection comprises a ratchet mechanism.

4. The device according to claim 1, wherein the upper end connection comprises a ratchet mechanism.

5. The device for bicycle according to claim 1, wherein the first and the second shafts further comprises a toothed part at the respective upper ends, and wherein the reverse mechanism further comprises at least one gear engaged with said toothed parts.

6. The device for bicycle according to claim 1, wherein the reverse mechanism is located within 20 cm from the bicycle seat.

7. The device according to claim 1, wherein the device is detachable and re-attachable to and from any bicycle.

8. The device according to claim 1, wherein the first and the second shafts further comprises a toothed part at the respective lower ends, said lower toothed part being engaged with a gear of the bicycle, such that said pedal levers create a force during no more than half of each pedal lever's circumferential rotation.

9. The device according to claim 1, wherein the first and second shafts further comprise a reverse mechanism coupled to the respective bottom ends, such that the device comprises two reverse mechanisms.

* * * * *